US006663979B2

(12) United States Patent
Deodhar et al.

(10) Patent No.: US 6,663,979 B2
(45) Date of Patent: Dec. 16, 2003

(54) COATING FOR GYPSUM BOARD FACE WITH UNIFORM GLOSS INTENSITY

(75) Inventors: Subhash Deodhar, Vernon Hills, IL (US); Tom Haugeberg, Mundelein, IL (US); Robert Negri, Lake Villa, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 10/024,911

(22) Filed: Dec. 19, 2001

(65) Prior Publication Data

US 2003/0113572 A1 Jun. 19, 2003

(51) Int. Cl.⁷ .............................................. B32B 29/00
(52) U.S. Cl. .................... 428/537.7; 428/328; 428/330; 428/324; 428/143; 428/153; 428/219; 428/489; 428/491; 428/203; 428/341; 428/342
(58) Field of Search ........................ 478/330, 537.7, 478/489, 328, 143, 153, 219, 341, 342, 491, 703, 324; 106/680, 715, 732, 735, 772, 778, 780

(56) References Cited

U.S. PATENT DOCUMENTS

| | | | |
|---|---|---|---|
| 2,894,857 A | | 7/1959 | Uraneck et al. |
| 3,422,587 A | | 1/1969 | Murray |
| 3,839,141 A | | 10/1974 | McKinnon |
| 4,057,662 A | | 11/1977 | Johnson et al. |
| 4,242,406 A | | 12/1980 | El Bouhnini et al. |
| 4,361,616 A | | 11/1982 | Bömers |
| 4,988,543 A | | 1/1991 | Houle et al. |
| 5,945,198 A | * | 8/1999 | Deodhar et al. |
| 6,406,779 B1 | * | 6/2002 | Carbo et al. ............ 428/219 |

* cited by examiner

*Primary Examiner*—Leszek Kiliman
(74) *Attorney, Agent, or Firm*—Greer, Burns & Crain, Ltd.; John M. Lorenzen, Esq.; David F. Janci, Esq.

(57) ABSTRACT

A coating for gypsum board includes a binder, a soy protein, and two or more pigments. Two of the pigments include calcium carbonate and magnesium carbonate and the magnesium carbonate makes up at least 20% by weight of the coating on a dry basis.

20 Claims, No Drawings

COATING FOR GYPSUM BOARD FACE WITH UNIFORM GLOSS INTENSITY

BACKGROUND

The present invention relates to a composition for coating gypsum board panels. More particularly, the present invention relates to a coating that provides a smooth, even and uniformly glossy wall surface across seams and nail spots that have been covered with a joint compound. The coating withstands sanding between coats of joint compound, resulting in a surface that takes paint and other decorative finishes evenly.

This invention concerns a gypsum board, particularly, a coated gypsum board. Gypsum board is a well known building material which has been used for years, primarily as an interior wall and ceiling material, but also to a certain extent as an exterior material. These boards have a gypsum core with pressed paper cover sheets on the back and face of the boards. A slurry of calcium sulfate hemihydrate and water is used to form the core, and is permitted to set by allowing the calcium sulfate hemihydrate to react with sufficient water to convert the hemihydrate into a matrix of interlocking dihydrate crystals. As the crystal matrix forms, the product slurry becomes firm and holds the desired shape. Excess water is then removed from the product by drying.

In the construction of buildings, gypsum wallboard, often known as drywall, is frequently used in the construction of walls and/or ceilings. Walls made from gypsum wallboard are traditionally constructed by affixing the panels to wood studs, metal framing or other substrate, and treating the joints between adjoining panels with a specially prepared adhesive called a joint compound. The side edges of the drywall panels are tapered, thus allowing the joint compound to be applied to the seam, between adjoining panels, in such a way that a monolithic surface is created when finished. This process generally proceeds by placing a taping joint compound within the joint formed by the abutted edges of the wallboards, and embedding a liquid-permeable paper or fiberglass tape within that compound. When dry (or set), a second coating referred to as a topping joint compound is applied over the joint, which can be subsequently lightly sanded upon drying. A third or finish coat is applied, allowed to dry, and lightly sanded to create a smooth monolithic surface that conceals any indication of where the drywall seams were. Another type of joint compound is an all-purpose grade that can be used for both embedding the joint tape and for applying the finish coats. A patterned or textured effect can be given to the finished wall and joint through the use of special application tools.

Walls created by this process may sometimes have uneven texture, take paint unevenly or have flat spots on a glossy surface, resulting in noticeable joints even when the wall has been correctly taped, sanded and painted. The difference in the composition between the gypsum board surface and the joint compound can result in a surface that unevenly takes paint or other decorative finishes applied to it. If the porosity of the two surfaces differs greatly, one surface absorbs more paint than the other, giving it a different appearance and texture. Variations in paint absorption across a wall will also change the way it reflects light, making it appear more glossy in some places than others.

Finishes are specified for construction according to their suitability with various types of lighting and wallcoverings. Level 1 and 2 finishes are used where the finished appearance is of no concern. Level 3 is suitable for walls that are to receive heavy or medium texture finishes or where heavy grade wallcoverings are to be applied. Areas to be painted with flat paints should specify a Level 4 finish. The highest level, Level 5, is the only finish recommended for use with enamel, gloss or semi-gloss paints or with severe lighting conditions. The *Gypsum Construction Handbook*, 90th Edition published by the United States Gypsum Company (1992) suggests that a Level 5 finish be achieved by a combination of high quality materials applied with certain techniques, that a thin skim coat of joint compound be applied to the entire surface followed by application of a high solids primer. A finish suitable for use with gloss or semi-gloss paint is generally achieved through high labor and material costs.

Further, the face paper used on gypsum boards generally does not maintain the same texture after repeated sanding. Attempts to blend the edges of the joint compound with the board surface during sanding can loosen fibers on the surface of the paper, causing them to rise up from the paper surface. Later, when traditional primer, paint or other decorative coating is applied, the paint can seal the loosened fibers in place, leaving a rough surface. The resulting wall shows the seams by rough patches on the paper near the edges of the joint compound when compared to either the joint compound, which has been sanded smooth, or the face paper toward the center of the panel, which has maintained its original surface because it was never sanded.

When using coatings that are to be applied during the manufacture of the gypsum board, the physical properties of the coating must be considered together with processing steps that it may have to withstand. For example, if a coating is impenetrable, it cannot be applied to the board before the board is dried in a kiln. Kiln drying causes steam to escape through the pores of the gypsum. A coating that cannot allow the steam to escape at the surface blisters or cracks during drying. Porosity of the coating also helps prevent pinholes from appearing in the painted surface due to air trapped within the dry film of the joint compound. If the air cannot diffuse through the coating, it may escape through the paint film, leaving pinholes in the paint surface.

One way to obtain an even surface is to apply a skim coat of thinned joint compound to the entire surface of the wall. After joints have been finished, a thinned joint compound is applied by hand to the entire wall. The wall surface is then immediately wiped as tightly as possible using a trowel or broad knife to remove excess joint compound and allowed to dry. This results in a very smooth surface that is uniform in color, porosity and texture, achieving a Level 5 finish when a primer is applied. This is a labor intensive, time consuming and expensive process.

Coatings have been applied to gypsum boards in the prior art for a variety of reasons. U.S. Pat. No. 3,839,141 to McKinnon teaches coating gypsum boards with an emulsion of wax, vinyl polymer and water. The resulting gypsum boards are particularly useful when used adjacent to concrete surfaces. When this coating is applied during the fabrication of the board, concrete will adhere to the surface of the board after the concrete is set. Johnson, in U.S. Pat. No. 4,057,662, applies a thin coating of polyethylene emulsion to a predecorated, printed paper already attached to a gypsum board. The coating overcomes the tendency of the predecorated boards from sticking to the back paper of adjacent boards when stacked for storage and shipping. Coatings have also been added to impart a waterproof surface to gypsum boards (U.S. Pat. No. 2,894,857 to Uraneck et al), and for thermal or acoustic insulation (U.S. Pat. No. 4,361,616).

In U.S. Pat. No. 3,422,587 to Murray, gypsum board is covered with a plaster coating during the manufacturing process that has a raised portion near the edges of the board. When the panels have been nailed into place, the surface of the panels is sprayed with water. As the water is absorbed, the coating softens. It is then shaped with a trowel to fill in the space between the panels and cover the nails. The raised portion of the coating at the edges provides sufficient plaster to fill in the joints. Although it will result in a uniform surface, this method has many disadvantages. The manufacture of such panels is a complex process. A binder solution must be sprayed onto the gypsum board to hold the coating onto the panel. Smoothing and forming of the coating must include a step to provide a raised portion at the edge of the panel to provide sufficient coating to cover the joint. Cutout portions of the coating must be provided at the edges to facilitate nailing of the panels to the framing or substrate. Finally, the coating must be baked to dry it on the surface of the board, requiring greater amounts of energy compared to merely drying the board itself. In addition to manufacturing concerns, the addition of up to ¾" (1.9 cm) of plaster formulation to a gypsum board panel would add appreciably to the weight of the article. Presence of the raised edges will make it difficult to stack the panels for shipping and storage. Overall, these panels could be considerably more expensive to manufacture, store and ship than conventional panels.

U.S. Pat. No. 5,945,198, Deodhar et al, herein incorporated by reference, discloses a coated wallboard that provides a light colored finish without the need for expensive manila top paper plies. The coating comprises a binder, pigments and soy protein, with a pigment to binder ratio of between 3:1 and 13:1. Although this formula provides a coating that has good color and is porous enough to allow moisture from the core of the gypsum board to evaporate during drying, it does not result in a Level 5 finish after the joints have been taped and patched. This coating will withstand light sanding, but it does not have sufficient resistance to withstand repeated sanding when multiple thin coats of joint compound are applied at joints or nail spots.

Additionally, the coating of U.S. Pat. No. 5,945,198 was not designed to produce a high gloss uniformly across a finished wall. Differences in porosity and texture on the board surface are most obvious when covered with a gloss or a semi-gloss paint. When one of these paints are applied over a non-uniform surface, it will absorb the paint to varying degrees and the differences will be reflected in the gloss intensity. Gloss intensity as measured with a gloss meter, measures the amount of light reflectance over the board face and at the joints, at various angles relative to the wall surface. Gloss uniformity is a measurement of the constancy of the reflectance. Values measured at the 60° and 85° viewing angles are considered to be critical views, as variances in gloss intensity become visually graphic. Gloss intensity at each of these angles is calculated by dividing the measured gloss over the joint by the measured gloss over the board and multiplying by 100%. If the gloss values over both the board and the joint are identical, the calculated gloss uniformity should be 100%. Differences in porosity and texture, as when a traditional joint compound is applied to an uncoated gypsum board, are most obvious when covered with a gloss or a semi-gloss paint. In order to produce a painted surface that looks uniformly glossy from various angles, it is necessary to closely match both the porosity and the texture of the joint compound with those properties at the surface of the gypsum board face.

It is therefore an object of this invention to provide an improved gypsum board which, when seamed with joint compound as part of a wall, has improved sandability.

It is another object of this invention to provide a gypsum board that will have a have a high gloss uniformity when finished with a joint compound.

It is still another object of this invention to provide a gypsum board that can be manufactured with a pre-coated face paper.

It is yet another object of this invention to provide a process for a gypsum board that produces a Level 5 surface after the joints are finished that is simple and economical to manufacture, store and ship.

BRIEF SUMMARY OF THE INVENTION

The above-listed objects are met or exceeded by the present invention, which features a coating and coating composition for gypsum wallboard. Use of this coating on wallboard panels results in a more uniform surface of the finished wall in terms of smoothness of the surface, and appearance both before and after painting. Decorating performance is improved by having a similar porosity between the panel surface and the joint compound surface, giving the panels an improved ability to accept high gloss paint. The coating composition is applied to the panels either during or after manufacture.

More specifically, the present coating for gypsum board comprises a binder, a soy protein, and two or more pigments, wherein two or more pigments include calcium carbonate and magnesium carbonate, and wherein magnesium carbonate comprises at least 20% by weight of the coating on a dry basis. It is also advantageous to add optional ingredients such as surfactants, biocides, defoamers, wetting agents or thickeners to control physical properties of the coating. The high quality finish that results from the use of this coating produces a uniform surface that takes paint evenly, significantly reducing differences in gloss intensity, even when glossy paints are used. A Level 5 finish can be obtained without the need for either the skim coat or primer currently recommended, significantly reducing the labor and material costs of interior finishing.

The coating of the present invention is particularly advantageous as it can be applied either before or after kiln drying. Air and steam penetrate the surface of the present coating, allowing steam to escape during drying and providing a smooth and acceptable finished surface with minimal cracks, blisters, or pinholes. In commercial applications, versatility of application simplifies obtaining a uniform product from all processing plants, even though the available equipment in each plant varies.

Reduction in costs for face paper can also be achieved through use of the coating of the present invention. The purpose of face paper is to provide a surface on which the slurry of gypsum and water is poured. High-grade manila face paper is generally used for at least one ply on the finished side of the board, providing a lighter, smoother finish. Under the face plies are 2–7 filler plies of hard fibers to give strength to the paper. The coating of the present invention may be used to replace the top, light colored plies of the face paper. Light color is provided by the coating, and, since the strength of the paper is provided by the plies of hard fibers, no strength is lost by removal of the top plies. Thus, a less expensive face paper may be selected, leading to cost savings.

Further, the coating of the present invention provides a surface that can be sanded without raising the fibers of the paper and the resulting rough surface after painting. This coating covers the surface of the paper and has an improved sanding resistance such that it does not wear away rapidly when sanded. This combination of properties allows sanding of the surface to a smooth finish, even at the edges where the joint compound has been feathered to make a smooth transition from the joint compound to the board face. A high quality, Level 5 finish can be achieved without the time and expense of applying a skim coat to the entire wall surface.

DETAILED DESCRIPTION OF THE INVENTION

A coating for gypsum board is made of a binder, two or more pigments and soy protein. In the following discussion, unless otherwise noted, all weights are based on the dry coating weight.

The binder acts to hold the coating together. Preferred binders in coatings of this type include polyvinyl acetate or blends of polyvinyl acetate and acrylics. When blends of polyvinyl acetate and acrylics are utilized, a ratio of polyvinyl acetate to acrylic of about 1:3 to about 1:2 is preferred. The most preferred binder has a ratio of polyvinyl acetate to acrylic of about 2:5. WALLPOL® 40-100, manufactured by Reichhold Chemicals, Morris, Ill., is the most preferred binder. It is a vinyl acetate homopolymer emulsion with excellent properties for interior wall coatings. Use of other binders, known to be useful for coatings or joint compounds, is contemplated and falls within the scope of this invention. Preferably, the binder is present in amounts ranging from about 10% to about 18% of the dry coating weight.

Two or more pigments are used as filler and to control various properties of the coating. A number of possible pigments can be chosen, but the improved properties of the present invention are obtained when the fillers include a combination of magnesium carbonate and calcium carbonate. Magnesium carbonate gives the coating the strength and resistance to hold up to sanding, allowing preparation of a very smooth and uniform surface. The coating includes at least 20% by weight magnesium carbonate, with at least 25% in the preferred coating. Dolomitic limestone, or dolomite, is a preferred source of both magnesium carbonate and calcium carbonate. Dolomite is a blend of carbonates of calcium and magnesium, including $CaCO_3$, $MgCO_3$ and $CaMg(CO_3)_2$, as well as minor components such as silicon dioxide, aluminum dioxide and ferric oxides. The ratio of calcium carbonate to magnesium carbonate varies by source, but is preferably in the range of from about 2:1 to about 3:2. DOLOCRON® 4512 (Specialty Minerals, Inc.—New York, N.Y.) is the most preferred dolomite, having about 40–45% magnesium carbonate. Preferably, the coating comprises at least 50% dolomite on a dry weight basis. In the most preferred coating composition, dolomite is from about 64% to about 86% of the wet coating composition by weight.

The particle size distribution of the pigments contributes to the porosity of the finished joint compound. How the pigments pack together on the coating surface contributes not only to the sandability of the surface, but also to the gloss uniformity. When the particles of pigment pack tightly together, there is less variation in the gloss across the wall surface. The preferred dolomite has a particle size distribution such that 100% passes through a 50-mesh screen, 99.99% passes through a 60-mesh screen, 99.9% through a 100-mesh screen and 85% through a 325-mesh screen of a U.S. Standard sieve.

Mica is also a preferred pigment. It helps to prevent shrinkage of the coating as it dries and is also used as an anti-caking agent. In the preferred embodiment, mica is present in amounts from about 9% to about 12% by weight. Mica P80F, (United States Gypsum Company, Chicago, Ill.) is the preferred mica. Color control through the use of appropriate pigments is advantageous for some applications. Use of this coating can eliminate the need for a primer prior to application of paint or other decorative coatings. This can only be achieved where the color differences between the coating and the joint compound will not show on the finished wall. Matching of the coating and joint compound should be sufficient that the color difference will not show through the finished surface, however, exact match of the color of these two compounds may not be desirable. Some color distinction makes it easier to determine where sanding is required at the edges of the joint compound and at the nail spots.

An important feature of the present invention is that the relative amounts of the pigment and binder are selected to provide a significantly porous coating. The coating of the present invention uses a greater pigment-to-binder ratio than conventional coatings, such as the coating disclosed by Long, in order to achieve a coating that is more porous than conventional wallboard coatings. Preferably, the pigments comprise more than 50% by weight of the coating on a dry basis. When mixed with water and ready to use, the most preferred coating composition comprises at least 43% of the wet coating weight.

Coating porosity is enhanced through the addition of soy protein. Specifically, an amount of soy protein between about 0.2% and about 0.8% of the total coating weight appears to work satisfactorily. However, in the preferred embodiment, an amount of soy protein between 0.2 and 0.5% of the total coating weight is used. Excessive soy protein is to be avoided due to the generation of an unpleasant odor from the board on humid days, even after installation.

Increased porosity of the coating of the present invention is an important feature of this invention because it prevents trapped air from creating pinholes in the painted surface. Tiny amounts of air are trapped under paint during the application process. If the surface under the paint is impenetrable, the air forms a tiny bubble that breaks as air escapes through the paint film. This results in a surface that is unsightly and very rough to the touch because of the pinholes that dot the surface. However, if the underlying surface is porous, the air is absorbed by the surface, eliminating the need to escape through the paint film.

A surfactant is added, when suitable, to aid in wetting the dry particles by breaking down the pigments and dispersing them. A variety of surfactants are suitable. Preferably, a surfactant should be used that is nonfoaming to minimize air entrained in the mixture. The preferred surfactant is SURFYNOL® 440 (Air Products and Chemicals, Inc., Allentown, Pa.), a nonfoaming, non-ionic surfactant. Any quantity of surfactant can be used that does not have deleterious effects on other properties of the coating. The amount of surfactant and the amount of water are balanced to achieve the appropriate pigment dispersion, viscosity and film thickness of the coating. The preferred coating has approximately 0.2% to about 0.5% surfactant by dry weight.

The amount of water that is added to the coating to make the coating composition depends on what type of apparatus is used to apply the coating composition. Generally, sufficient water is added to achieve a target viscosity. However, those skilled in the art will recognize that the target viscosity will change depending on the application method. Coating compositions applied through a spray coater will differ in the viscosity compared to those applied by roll coaters or vacuum coaters. Once the target viscosity has been selected, amounts of water and surfactant are balanced to achieve the target viscosity, to yield the appropriate application properties, to break down the solid pigments and disperse them. The preferred coating composition has between 8 and 10.5 pounds of dry ingredients per gallon of water.

It will be appreciated by those skilled in the art that other compounds can be added to the coating or coating composition of the present invention. Although preferred amounts and types of the compounds are disclosed, use of other compounds known in the art at suitable levels is envisioned to produce specific physical properties. A defoamer is optionally added to reduce air bubbles that appear in the coating composition as a result of mixing. The preferred coating composition utilizes from about 0.06% to about 0.15% of DA-10 defoamer, the percentage being based on the dry weight of the coating. Biocides are useful in minimizing the growth of mold, mildew or bacteria in the wet coating, especially if stored in ready-mix form. KATHON® LX (Rohm & Haas, Philadelphia, Pa.) is the preferred biocide, in levels ranging from about 0.15% to about 0.45%. Thickeners may be used to adjust the viscosity of the coating composition when mixed with water. Cellulosic thickeners, such as METHOCEL® 228 (Dow Chemical Co., Midland, Mich.), are preferred. Addition of about 0.13% to about 0.19% of the thickener is particularly useful. If needed, a wetting agent is also used to aid in wetting the large number of small particles included in the coating mix. AMP-95® Amine Neutralizer (National Starch & Chemical, Chicago, Ill.) is the preferred wetting agent. It is added at the rate of 0.06% to about 0.11% based on the dry weight of the coating. To those familiar with coatings, it will be obvious to vary other minor additives to obtain a coating or coating composition with specific properties consistent with this invention.

Another important feature of the present invention relates to the weight of the coating composition applied to the wallboard. The coating weight is sufficiently heavy to yield a durable coating, while balancing other concerns such as porosity and cost. Sandability of this coating through multiple applications of joint compound is, in part, due to a heavier coating weight. In the preferred embodiment, the coating composition is applied in amounts in excess of 10 pounds of coating per 1000 square feet (49.0 g/m2) of gypsum board. More preferably, the coating composition is applied in excess of 15 pounds per 1000 square feet (74 g/m$^2$). When the coating is supplied as a dry powder that is mixed with water, about 8.0 pounds to about 10.5 pounds of coating mix should be used per gallon of water (0.8–1.05 Kg/l). The increased porosity of the coating of the present invention facilitates the use of a greater coating weight without unduly diminishing the overall porosity of the coating. Unless otherwise noted, all coating weights contained herein are reported on a dry basis.

The coating composition of the present invention is prepared by mixing the coating components with water. Preferably, the soy protein is first dissolved in water together with the surfactant, if present. Allowing these two components to soak for several minutes disperses the soy protein. Preferably, the protein and surfactant are allowed to dissolve for more than 5 minutes, and, in the most preferred coating, 10 minutes or more. After dispersion of the soy protein, the remaining components, including any binders and the pigments, including calcium carbonate and magnesium carbonate, are mixed into the solution, in no particular order. The solution is mixed in order to obtain a homogeneous mass before its application to the gypsum board panel.

Application of this coating to gypsum board is accomplished by any means known in the art. The coating composition can be applied to finished gypsum board in a process entirely separate from its manufacture. In the alternative, application of the coating composition can take place during manufacture of the gypsum board, either before or after the drying kiln. Any technique can be used to apply the present coating in order to accommodate varying equipment configurations at manufacturing facilities, as long as the water and surfactant, if present, are balanced to provide an appropriate coating weight for the coating apparatus being used. The coating composition of the present invention is applied to the gypsum board panels by any coating method known in the art. Roll coaters, spray coaters, curtain coaters, rod coaters, vacuum coaters are examples of coating equipment that can be used to apply the instant coating composition. These conventional coating methods are well understood to those having ordinary skill in the art.

The preferred coating method utilizes a vacuum coater when applying the coating composition on the line in a gypsum board plant, because it produces a uniform distribution of the coating material. Preferably, the vacuum coater is positioned upstream from the kiln used to cure the gypsum slurry and remove excess moisture from the wallboard. In comparison to other available coating techniques, the vacuum coater has a high coating transfer efficiency, can be used at any speed, allows the coating composition to be applied to a tapered edge and requires no special containment facilities. Optimally, the coater is located between the inverter and the index table. If the coater is located after the kiln, it should be located soon after convergence of the boards coming from the different decks in the kiln.

As an alternative, the coating composition is applied to the cover sheet before gypsum board is made. When the gypsum core is poured between the sheets of face paper, the coating can already be in place on one of the face papers. When pre-coating the face paper, a rod coater is preferred. Multiple layers of coating are applied, if desired, by passing the paper or board through the coater more than once, or through multiple coaters. The coating composition of the present invention is applied to the cover sheet through a variety of known methods, including those listed above. These conventional coating methods are well understood by those of ordinary skill in the art. Accordingly, an explanation of their efficacy is unnecessary. When the coater is located upstream of the kiln, the overall porosity of the coating applied to the cover sheet must be sufficient to allow the excess moisture to evaporate through the cover sheet.

EXAMPLE 1

A coating for gypsum board was made at USG's Gypsum, Ohio joint treatment plant. The composition for one hundred gallons of the coating composition is described in Table I.

TABLE I

| Component | Weight, pounds (Kg) |
|---|---|
| Water | 414.3 (188.1) |
| Soy Protein PX047 | 3.5 (1.6) |
| AMP-95 ® AMINE NEUTRALIZER | 1.0 (0.45) |
| DOLOCRON ® 4512 | 700 (317.8) |
| Mica P80F | 100 (45.4) |
| DA-10 Defoamer | 1.0 (0.45) |
| KATHON ® LX BIOCIDE | 3.0 (1.4) |
| Reichhold 40–100 PVAC/ACR | 142.0 (64.5) |
| METHOCEL ® 228 | 1.5 (0.68) |
| SURFYNOL ® 440 | 4.0 (1.8) |

Water was mixed with the surfactant and soy protein and allowed to disperse for approximately ten minutes. To this mixture, the remaining ingredients were added.

Several SHEETROCK® brand gypsum boards (United States Gypsum Company, Chicago, Ill.) were made using unlined manila paper on the board line at Fort Dodge. An AM&D vacuum coater (Delle Vedoye USA, Charlotte, N.C.) was used to coat the gypsum board with either the coating composition of the present invention. The coated surface had good tape resistance and good dry rub resistance. The coating was sandable, similar to the joint treatment surface.

Gypsum boards were also coated with SHEETROCK® First Coat (United States Gypsum Company, Chicago, Ill.), SHEETROCK® Wallcovering Primer (United States Gypsum Company, Chicago, Ill.) and Sherwin-Williams (Sherwin-Williams, Chicago, Ill.) GMS006 coatings. A comparison of finishing properties of the various coatings are shown in Table II.

TABLE II

| Coating Type | Open Time, Joint Compound | 60° Gloss Uniformity, % | 85° Gloss Uniformity, % |
| --- | --- | --- | --- |
| Example 1 | 29 | 83.11 | 72.10 |
| SHEETROCK ® First Coat Primer | 21 | 59.06 | 33.22 |
| SHEETROCK ® Wallcovering Primer | 34 | 83.56 | 85.0 |
| Sherwin-Williams GMS6006 Primer | 19 | 65.81 | 61.09 |

Open time tests are used to determine the relative performance of different formulations over the same substrate. Normally, as water is absorbed by the substrate, the joint compound thickens and it becomes increasingly difficult to wipe the excess and reapply it to a new portion of the surface. The "nail spot" open time test is a measurement of the number of nail spots that can be coated with 8 grams of joint compound before it becomes too dry to reapply.

The gloss of each of the gypsum boards was measured using a BYK variable angle gloss meter (BYK-Gardner USA, Columbia, Md.). A 6 mil wet film thickness of latex semi-gloss finish paint was applied using both the wet film applicator and roller methods. Gloss intensity over the board face and at the joints was measured at the 600 and 850 viewing angles that are considered to be critical views. At both critical angles, the gloss intensity of the board with the coating of the subject invention approached that of the board with the best primer.

Gloss values and open time of the instant coating were tested against three primers for gypsum wallboard. In all three tests, the coating of this invention performed better than the SHEETROCK® First Coat and the SHERWIN WILLIAMS® GMS6006, and approached the performance of the best product, SHEETROCK® Wallcovering Primer. Thus, a wallboard surface with the coating of the present invention simulates the best commercial primer applications in gloss intensity and open time tests, without the mess, labor and expense of applying a primer to the wall. The coating and coating composition of this invention replace the functionality of both the skim coat of joint compound and the primer in achieving a Level 5 drywall finish.

While several particular embodiments of the coating for use in manufacturing gypsum board have been shown and described, it will be appreciated by those skilled in the art that changes and modifications can be made thereto without departing from the invention in its broader aspects and as set forth in the following claims.

We claim:

1. A coating for gypsum board comprising a binder, a soy protein, and two or more pigments, wherein two of said pigments comprise calcium carbonate and magnesium carbonate, and wherein said magnesium carbonate comprises at least 20% by weight of said coating on a dry basis.

2. The coating of claim 1, wherein said binder is present in amounts from about 10% to about 18% of the dry coating weight.

3. The coating of claim 1, wherein said binder is a polyvinyl acetate or blend of polyvinyl acetate and acrylic.

4. The coating of claim 3, wherein said binder is a blend of polyvinyl acetate and acrylic in a ratio in the range of approximately 1:3 to about 1:2.

5. The coating of claim 1, wherein said magnesium carbonate comprises at least 25% by weight of said coating on a dry basis.

6. The coating of claim 1 wherein said magnesium carbonate and said calcium carbonate are in the form of dolomitic limestone.

7. The coating of claim 6 wherein said dolomitic limestone has a particle size distribution such that:

100% passes through a 50 mesh U.S. Standard screen;

a minimum of 99.99% passes through a 60 mesh U.S. Standard screen;

a minimum of 99.9% passes through a 100 mesh U.S. Standard screen; and a minimum of 85% passes through a 325 mesh U.S. Standard screen.

8. The coating of claim 6, wherein said dolomitic limestone is present in amounts from about 64% to about 86% of the dry coating weight.

9. The coating of claim 1, wherein said soy protein is present in amounts ranging from about 0.2% to about 0.8%.

10. The coating of claim 1 further comprising at least one of a surfactant, a defoamer, a biocide, a wetting agent and a thickener.

11. A coating composition for a gypsum board comprising the coating of claim 1 and water.

12. The coating composition of claim 11 wherein said coating composition comprises about 8.0 to about 10.5 pounds of dry ingredients per gallon of water (0.8–1.05 Kg/l).

13. The coating composition of claim 11 wherein said coating composition has a viscosity sufficient to be applied in excess of 10 pounds per thousand square feet (49.0 g/m2) on a dry basis.

14. A method of coating a gypsum board comprising the steps of:

preparing a coating composition comprising a coating and water, said coating comprising a binder, a soy protein, and two or more pigments, wherein two of said pigments comprise calcium carbonate and magnesium carbonate, and wherein magnesium carbonate comprises at least 20% by weight of said coating on a dry basis; and applying said coating composition to a gypsum board.

15. The method of claim 14, wherein said application step utilizes in excess of about 10 pounds of said coating per thousand square feet (49.0 g/m2) of gypsum board.

16. The method of claim 14 further comprising feeding said coating composition to a coating apparatus; and wherein said application step is performed by said coating apparatus.

17. The method of claim 16 wherein said coating apparatus is one of a rod coater, a spray coater, a vacuum coater, a curtain coater and a roll coater.

18. The method of claim 14 wherein said preparation step further comprises:

dissolving said soy protein and a surfactant in said water;

waiting for said soy protein to disperse;

adding said binder and said pigments; and mixing to form said coating composition.

19. A coated gypsum board comprising a gypsum core;

paper facing on one or more sides of said gypsum core; and a coating composition comprising water and a coating, said coating comprising a binder, a soy protein, and two or more pigments, wherein two of said pigments comprise calcium carbonate and magnesium carbonate, wherein magnesium carbonate comprises at least 20% by weight of said coating on a dry basis, and wherein said coating composition is applied in excess of about 10 pounds per thousand square feet (49.0 g/m2) on a dry basis to said paper on at least one side.

20. The coated board of claim 19, wherein said magnesium carbonate and said calcium carbonate are in the form of dolomitic limestone and said wherein said dolomitic limestone is present in amounts from about 64% to about 86% of the dry coating weight.

* * * * *